E. L. RINMAN.
PROCESS OF TREATING WASTE LIQUORS FROM SODA PULP MILLS.
APPLICATION FILED APR. 10, 1909.
1,005,882.
Patented Oct. 17, 1911.
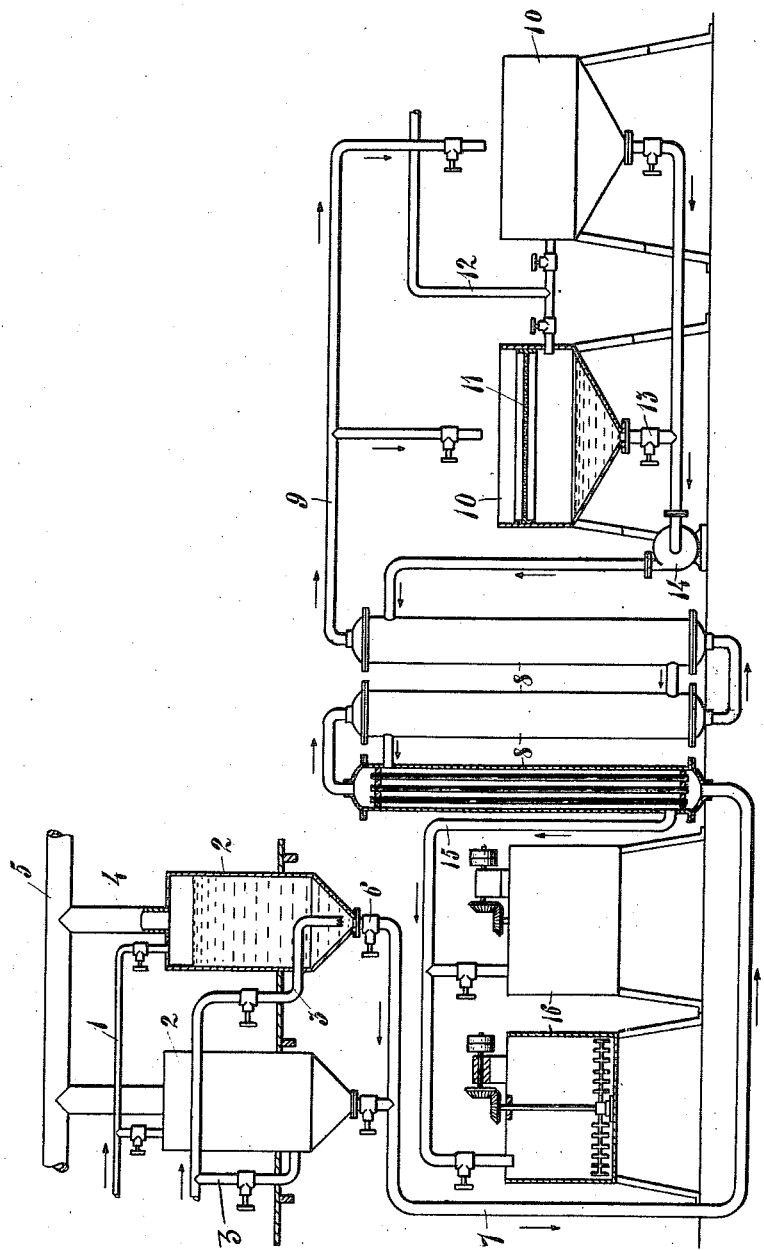
Witnesses
Inventor
Erik Ludvig Rinman

UNITED STATES PATENT OFFICE.

ERIK LUDVIG RINMAN, OF GOTTENBORG, SWEDEN.

PROCESS OF TREATING WASTE LIQUORS FROM SODA-PULP MILLS.

1,005,882.

Specification of Letters Patent.

Patented Oct. 17, 1911.

Application filed April 10, 1909. Serial No. 489,168.

*To all whom it may concern:*

Be it known that I, ERIK LUDVIG RINMAN, a subject of the King of Sweden, and resident of Gottenborg, in the Kingdom of Sweden, have invented new and useful Improvements in Processes for Treating Waste Liquors from Soda-Pulp Mills, of which the following is a specification.

This invention relates to an improved process of treating waste liquors from soda pulp mills.

Attempts have heretofore been made to obtain useful products from the waste liquors from soda (sulfate) pulp mills by treating said liquors with carbonic acid. For instance, Tessié du Motay has described in his patent specification No. 132452 in what manner the organic substances of a black liquor may be precipitated by carbonic acid and utilized. However, such a precipitation of the organic substances could not be performed otherwise than so as to cause a great quantity of soda to be precipitated with the said substances. On account of the soda thus precipitated being lost, the process has not been practically available. In order that the regeneration of a black liquor shall be economical, it is necessary that by the said process the liquor is freed from the organic substances without too great a loss of soda arising.

The object of the present invention is to provide a process according to which the precipitation of the organic substances by means of carbonic acid is performed with a minimum loss of soda.

The invention consists, chiefly, in that the treatment of the waste liquors with carbonic acid is performed in the presence of such a quantity of alkali compounds (salts and hydrates) soluble in the said liquor that a concentration is obtained which may be recognized by the fact that, if the precipitation with carbonic acid is performed at or about 75° centigrade, the ulmous substances (ulmic compounds) are obtained in a fine-grained or crystalline form. By this method the precipitate will be obtained in an easily filterable and easily washable form. The process may be employed whether the liquor contains sulfurous organic compounds or not, and it may be carried out at ordinary temperature or, preferably, at a raised temperature, as hereinafter more particularly described. The desired concentration of the soluble alkali compounds (salts and hydrates) may be obtained by evaporation, by adding salts or hydrates soluble in the said liquor, or by a combination of these means.

In order that my invention may be more easily understood, I will now proceed to more fully describe the nature of the invention and in what manner it may advantageously be carried into effect.

An examination of the organic compounds which are formed when cellulose materials are boiled with caustic soda proves that the said compounds may be divided in two groups, apart from all regard to substances which are certainly formed in boiling cellulose but which may be separated from the liquor on account of their property of being volatile or because they distil over with water, such as turpentine, methyl alcohol, (mercaptans, sulfids), ammonia, etc. One of the said main groups of organic compounds is recognized by the same having a less acid character than carbonic acid, whereas the other group has a more acid character. For the sake of simplicity, the first type of organic substances are hereinafter called ulmous substances, the other type being called organic acids.

The ulmous substances form the bulk of the organic compounds fouling the black liquors, from fir-wood about 30 per cent. of the weight of the absolutely dry wood. Regarding their properties the following is to be noted. They are colloidally soluble in water which has been made weakly alkaline by carbonate of soda but are precipitated from such a water solution if a sufficient quantity of alkali salts is added. They are difficult to dissolve in cold water, easier in warm water. When precipitated from a warm solution, they are obtained in a form which is more difficult to dissolve than that obtained when they are precipitated from a solution of ordinary temperature. They are easily dissolved in alkaline liquids, more difficult in liquids of weak alkalinity, such as water alkalized by carbonate of soda. Their sodium salts are decomposed by acids, even by so weak an acid as carbonic acid. On account of these properties of the ulmous substances, it is obvious that they cannot be precipitated in a filterable form by carbonic acid from their sodium salts in a black liquor without certain measures being taken.

I will now describe in what manner a satisfactory precipitation may be obtained.

In order that the ulmous substances freed by carbonic acid from their sodium salts shall be precipitated, the black liquor must have a certain concentration of alkali salts soluble therein. It is obvious that precipitating salts are formed when carbonic acid gas is led into the black liquor containing hydrate of soda and sodium combined with organic substances, whereby carbonate of soda (eventually sodium bicarbonate) is formed. If dry cellulose matters are boiled by indirect steam with caustic soda, and especially if a suitable quantity of inorganic alkali salts is added to the lye before boiling, the black liquor obtained may have a concentration enabling the ulmous substances to be directly precipitated by carbonic acid in a filterable form. Generally, however, dilute black liquors are obtained, which must be reduced by evaporation to a suitable concentration. By evaporating the liquor before, during, or after the precipitation with carbonic acid, obviously such a salt concentration of carbonate of soda of any strength up to saturated solution is obtained. However, in order to obtain this result a strong evaporation is required which would be for economical and other reasons disadvantageous.

In order, under all circumstances, to obtain a sufficient concentration of salts soluble in the liquid, it is preferred to add to the liquor a sufficient quantity of one or more inorganic alkali salts soluble therein, since the presence of such salts considerably increases the effect in precipitating the ulmous substances without preventing the employment of the lye for boiling cellulose matters. Among the salts which may be used potassic and soda-salts and, further, ammonium carbonate may be mentioned. The potassic salts are inappropriate on account of their high price. Among the sodium salts only the sulfate, the carbonate and the chlorid may, preferably, be used. Among the salts mentioned the sodium sulfate is very active but it gives rise to sulfurous lyes if the lime used in causticizing is reburned for repeated use or if, on any occasion, the lyes are regenerated by calcination. Sodium carbonate may, obviously, be employed, but a better result is obtained by using sodium chlorid which is more active and also cheaper than sodium carbonate.

If a black liquor is completely saturated with sodium chlorid or another inorganic sodium salt, the ulmous substances are practically completely precipitated if carbonic acid is led into the liquor. In practice, it is, however, not necessary to add such a quantity of the salt as to obtain full saturation, since even a far smaller quantity is sufficiently active. In precipitating the ulmous substances, by means of carbonic acid, from a black liquor, a sufficient precipitation is obtained, for instance in boiling fir-wood, if the liquor during or after the precipitation has a concentration of about 100 gr. of $Na_2O$ and 50 gr. of $NaCl$ per liter of liquor (about 20° Bé.)

As the ulmous substances precipitated in a cold solution are easily soluble in water which, however, is not the case when they are precipitated in a warm solution it is obvious that, in order that they may be washable without too great a loss, said substances should either be precipitated from a warm solution or be warmed during or after the precipitation so as to become difficult to dissolve. It thereby appears that the ulmous substances obtain a grainy form if they are heated, after the precipitation, to about 75° centigrade, and particularly they are obtained in a very fine-grained or micro-crystalline form if the liquor during the precipitation has a temperature of about 75° centigrade. If the ulmous substances are heated to temperatures above 85° centigrade they are very liable to cake and melt. Even at a temperature of about 75° centigrade they may cake, if subjected to pressure. If it is desired to maintain them in a filterable form, they should, therefore, at this temperature be kept in motion in the liquor and be cooled before filtration, since, if they are cooled to ordinary temperature, they do not cake but filter and are very easily washed. Ulmous substances precipitated in a filterable form lose this property if they are exposed for a long time (some days or weeks according to whether the liquor is kept in motion or not) to a solution of sodium carbonate. On account thereof, precipitated ulmous substances which are to be filtered should be separated from the mother-liquor without delay. By heating and subsequent cooling, ulmous substances which cannot be filtered are again made filterable.

In order that the ulmous substances may be precipitated from a black liquor at about 75° centigrade in a fine-grained or crystalline form, the liquor must have a sufficient concentration of salts soluble therein; if this is not the case, neither a substantially complete precipitation nor a fine-grained, easily filterable product is obtained. Too great a concentration of ulmous substances makes the precipitate so extremely fine-grained that it will be difficult to filter and wash. In order to avoid this, the liquor may be concentrated partly by evaporation and partly by adding alkali salts, preferably salts with strong acids, since such salts are more active than other salts.

It should be noted that too high a concentration of ulmous substances is unfavorable in that respect that the precipitate of said substances will be more difficult to filter, whereas the alkali salts dissolved in the lye may have any concentration up to full saturation without in any way altering the result. For that reason only a minimum but no maximum concentration of the lye can be stated.

A waste liquor freed from the ulmous substances according to the principle hereinbefore described may be used, after causticizing, for boiling fresh quantities of cellulose matters. Hereby, obviously, care must be taken that the liquor contains a sufficient concentration of $Na_2O$. The dissolving of salts in the liquor has no disadvantages but, on the contrary, a favorable influence, in that, particularly in the presence of sodium chlorid, a more easily bleached and stronger fiber is obtained. One and the same liquor, treated each time in the manner hereinbefore described, may be used without inconvenience several times for boiling cellulose matters since the increase in the quantity of organic acids (chiefly resinous acids, formic acid and acetic acid) is not so great that the said acids will have any disadvantageous influence when the liquor is used for boiling further quantities of cellulose matters. In the regeneration of the lye by means of carbonic acid the organic acids serve as precipitating salts, and on account thereof the quantity of inorganic precipitating salts may be reduced. In practice, it is therefore only necessary that for each boiling a fraction of the liquor previously employed is replaced by fresh lye of suitable composition. The liquor removed may, if desired, be treated for recovering sodium carbonate or said salt and other salts.

A satisfactory precipitation of the ulmous substances of a black liquor by means of carbonic acid is also obtained if the precipitation takes place in the presence of ammonium carbonate as a precipitating salt. However, this procedure has the drawback that greater care is required during working, in order to avoid loss of ammonia. On the other hand, it has the advantage that the carbonate of ammonia may be easily separated from the liquor, by known methods, after the ulmous substances have been separated, so that in boiling the cellulose raw material, a soda-lye of a well known efficacy may be employed. Moreover, the ulmous substances may thereby be easily freed from mother-liquor and from wash-water that may contain carbonate of ammonia. Addition of other ammonium salts has, obviously, no other influence than the addition of the corresponding sodium salt and carbonate of ammonia.

In the accompanying drawing, I have shown, in side-elevation and partial section, a system of apparatus adapted for carrying my invention into effect. It is, however, to be noted that I do not limit myself to any specific apparatus since any apparatus suitable for the purpose may be employed.

Referring to the drawing, the hot black liquor having a suitable concentration and temperature (about 75° centigrade) is led through tubes 1 into one or the other of a series of receptacles 2, 2. Then carbonic acid gas is led through a tube 3 into the black liquor, whereby a precipitate is obtained consisting chiefly, of ulmous substances, as hereinbefore described. It is not necessary to use pure carbonic acid gas, but in order to reduce the costs, chimney gases (containing about 10 per cent. of carbonic acid gas) or still better combustion gases from lime-kilns (containing about 30 per cent. of carbonic acid gas) may be used. The air or gas which leaves the black liquor may be drawn off through tubes 4 and 5 leading to a chimney (not shown). When the ulmous substances have been precipitated, the bottom valve 6 is opened and the liquor with the precipitate suspended therein is caused to pass through a tube 7 to the coolers 8 and thence through a tube 9 to the filtering apparatus 10 in which the space beneath the filter 11 is connected by a tube 12 to a vacuum apparatus (not shown). The filtrate is drawn off through a cock 13 and caused by a pump 14 to pass through the coolers 8 in a direction opposite to that of the liquor from the receptacles 2, by which it is again heated to about 75° centigrade. From the coolers 8 a tube 15 leads to the mixers 16 where the liquor is causticized by lime in usual manner.

All additions to the liquor of sodium chlorid, soda, and the like, should, preferably, be made before causticizing so that disagreeable impurities may be precipitated.

If the ulmous substances are precipitated in a cold solution which is thereupon heated for transforming the said substances into a more easily filterable and washable form, they cannot be so easily nor so completely freed from the mother-liquor, wherefore this procedure is not so advantageous as when the precipitation is effected at about 75° centigrade.

In precipitating the black liquor by means of carbonic acid, the method of sprinkling the liquor in the form of a fine spray, for instance by an atomizer or a centrifugal liquid spreader, into carbonic acid gas does not entail any advantage, as compared with the method of precipitating at a temperature of about 75° centigrade.

It is remarked that by washing the ulmous substances with a strong acid, for instance hydrochloric acid, and subsequent washing with water a product is obtained which is almost chemically free from ash. Ulmous substances, washed with water and thereupon acidified may be easily freed from their percentage of mother-liquor by heating under pressure to temperatures between 120° to 200° centigrade. The organic substance melts to a resinous mass while the mother-liquor is separated as such.

I claim:

1. The method of precipitating, in a filterable form, the ulmous substances contained in the waste liquors from soda pulp mills, which consists in treating said liquors at a concentration of about 20° Bé., and at a temperature of about 75° C., with carbon dioxid, substantially as and for the purpose set forth.

2. The method of precipitating, in a filterable form, the ulmous substances contained in the waste liquors from soda pulp mills, which consists in treating said liquors with carbon dioxid, in presence of an alkali metal salt of an inorganic acid which is not weaker than carbonic acid, substantially as and for the purpose set forth.

3. The method of precipitating in a filterable form, the ulmous substances contained in the waste liquors from soda pulp mills, which consists in treating said liquors with carbon dioxid, in presence of a sodium salt of an inorganic acid which is not weaker than carbonic acid, substantially as and for the purpose set forth.

4. The method of precipitating, in a filterable form, the ulmous substances contained in the waste liquors from soda pulp mills, which consists in treating said liquors with carbon dioxid, in presence of sodium chlorid, substantially as and for the purpose set forth.

ERIK LUDVIG RINMAN.

Witnesses:
   Aug. Sörensen,
   Karl Runcskog.